F. W. KREMER.
TIRE MAKING MACHINE.
APPLICATION FILED JULY 31, 1912.
1,243,076.
Patented Oct. 16, 1917.
2 SHEETS—SHEET 1.
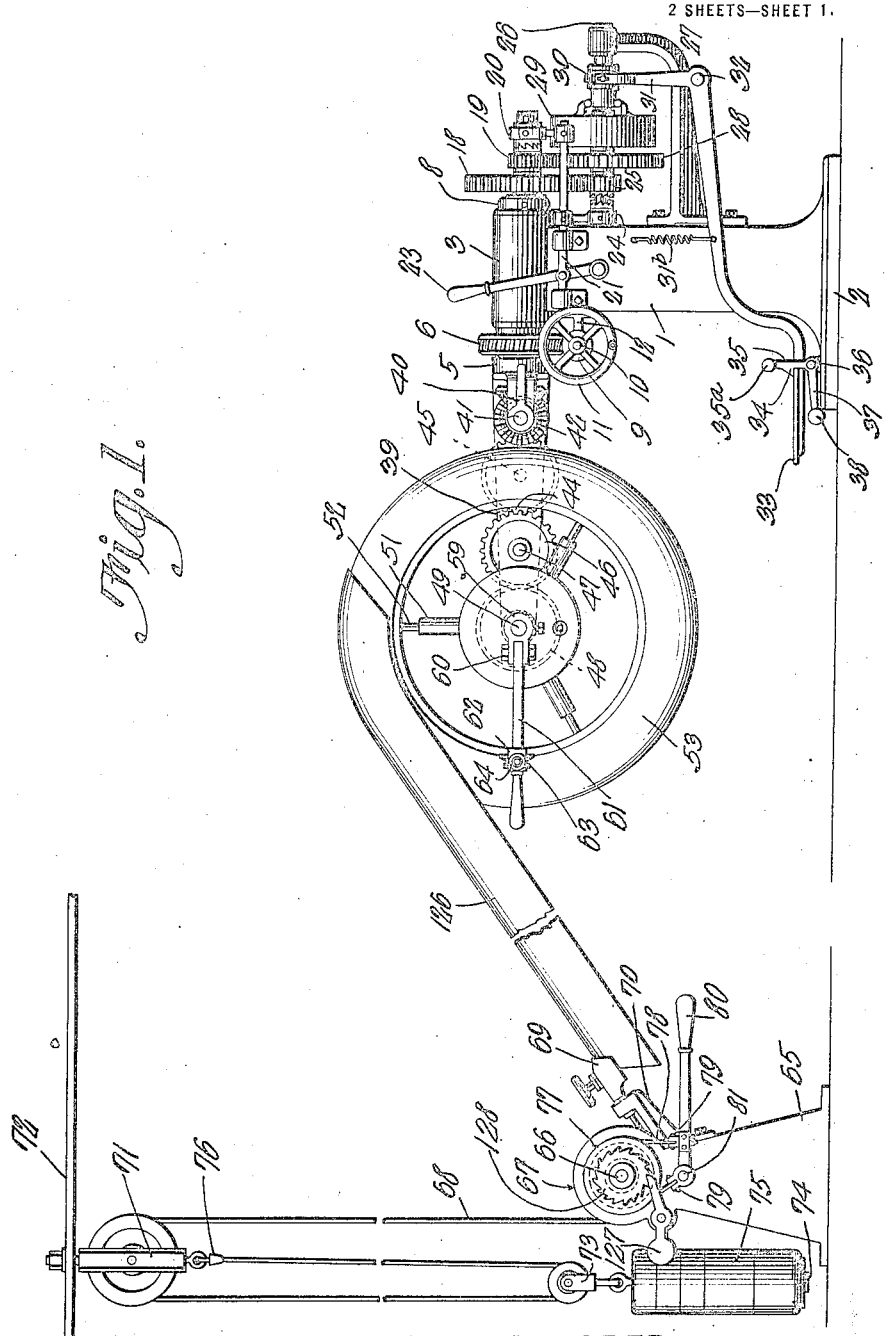
Witnesses
Franklin W. Kremer Inventor
by
Attorneys F. W. KREMER.
TIRE MAKING MACHINE.
APPLICATION FILED JULY 31, 1912.
1,243,076.
Patented Oct. 16, 1917.
2 SHEETS—SHEET 2.
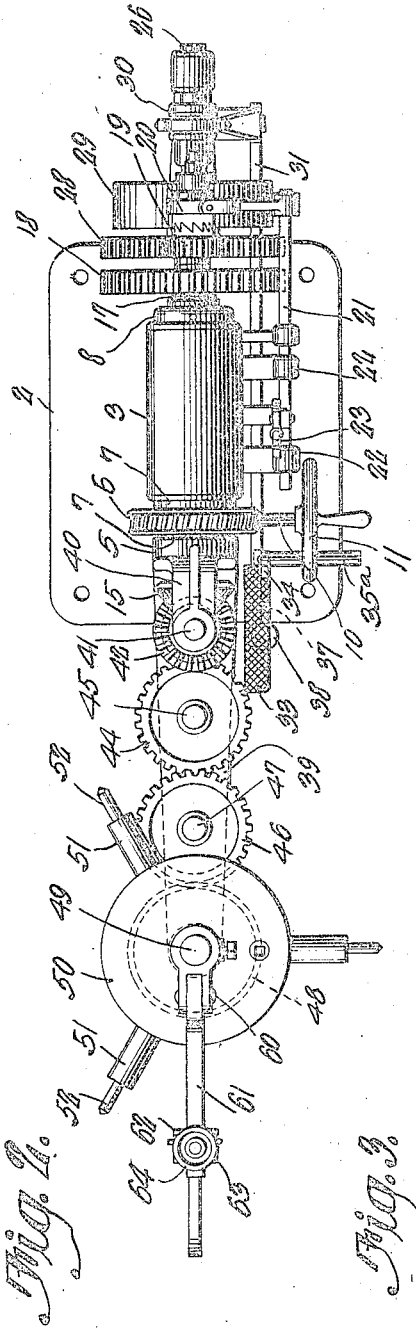
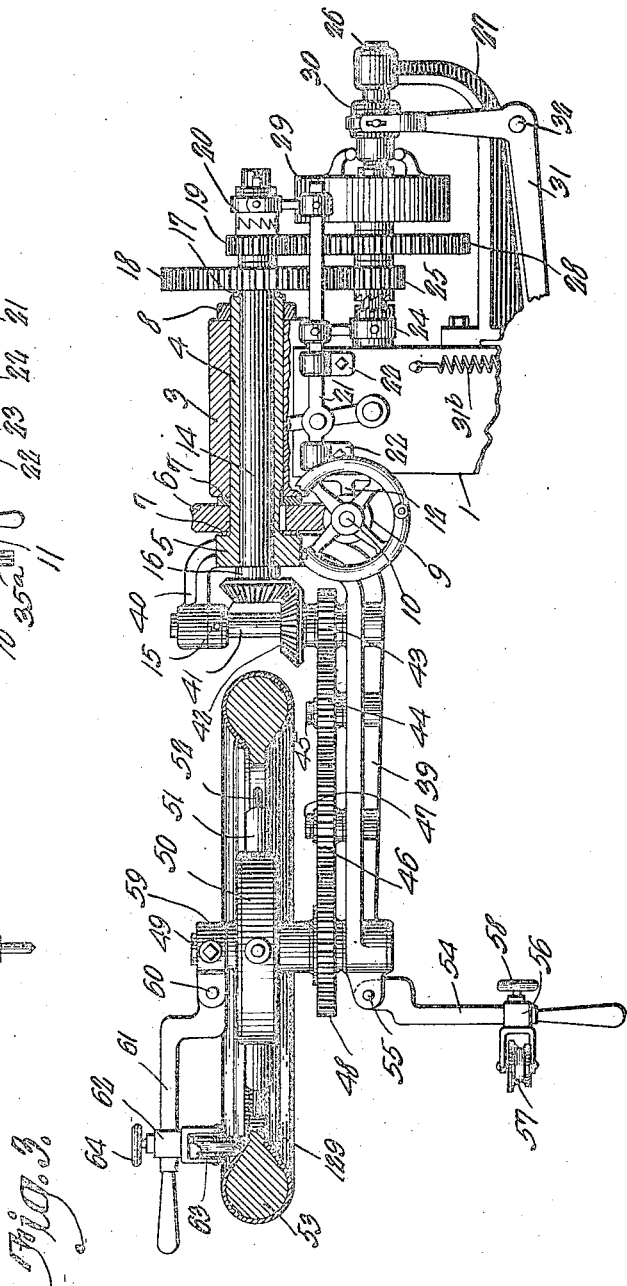
Franklin W. Kremer, Inventor

UNITED STATES PATENT OFFICE.

FRANKLIN W. KREMER, OF CARLSTADT, NEW JERSEY.

TIRE-MAKING MACHINE.

1,243,076.  Specification of Letters Patent.  Patented Oct. 16, 1917.

Application filed July 31, 1912. Serial No. 712,550.

*To all whom it may concern:*

Be it known that I, FRANKLIN W. KRE-MER, a citizen of the United States, residing at Carlstadt, in the county of Bergen and State of New Jersey, have invented a new and useful Tire-Making Machine, of which the following is a specification:

The object of this invention is to provide a tire forming machine adapted to facilitate the application of the textile web to the core under uniform tension so that under stress the various plies of the tire coöperate accurately, the strain being distributed evenly throughout the structure, and to provide against such laying on of the plies as will result in weak zones which detract from the durability of the structure. In the usual manual application of the webs to a core it has been found in practice that the strength of the operator and his interest in the subject are important factors in determining the resultant strength and durability of the product, and though a hand-made tire has heretofore been regarded as superior to a machine-made tire, even the most rigid care will not prevent a certain variation in the stretching tension to which the web must be subjected, and any such variation is detrimental, on the principle that where one layer is under a greater tension than others, the greater proportion of the strain to which the finished tire is subjected must be sustained by that layer until it stretches sufficiently or yields entirely to permit the other and less tight layers to come into play. It is therefore the purpose of this invention to provide a machine which with mathematical and mechanical accuracy will apply the webs successively under an absolutely uniform tension, and with this object in view, together with other minor objects which will appear as the structure is disclosed, the invention resides in the combination and arrangement of parts and in the details of construction hereinafter described and claimed, it being understood that changes in the precise embodiment of the invention herein disclosed, can be made within the scope of what is claimed without departing from the spirit of the invention.

In the drawings:—

Figure 1 shows one form of the invention in side elevation.

Fig. 2 is a top plan of a portion of the structure shown in Fig. 1, the core holder being rotated through an angle of 90°.

Fig. 3 is a vertical section of the structure shown in Fig. 2, the core-holder appearing as shown in Fig. 2 and the core being shown as an added detail.

In carrying out the invention, there is provided a supporting structure, ordinarily taking the form of a pedestal 1, provided at its lower end with a base 2, and having a bearing 3 at its upper end. Mounted to rotate in the bearing 3, but restrained against free rotation by means hereinafter described, is a sleeve 4, provided at one end with a head 5. A worm wheel 6 is secured to the sleeve 4, washers 7 being interposed between the worm wheel 6 and the head 5, and between the worm wheel 6 and one end of the bearing 3, to prevent longitudinal sliding movement of the sleeve 4 in one direction. Longitudinal sliding movement of the sleeve 4 in an opposite direction is prevented by means of a collar 8, secured to the sleeve 4 and engaging the opposite end of the bearing 3. The worm wheel 6 is actuated by a worm 9 carried by a shaft 10, provided with a hand wheel 11 and journaled for rotation in a bracket 12 which may be supported by the pedestal 1.

Journaled for rotation in the sleeve 4 is a shaft 14 provided at one end with a beveled pinion 15, abutting against a collar 16 upon the shaft 14 which collar, in its turn, abuts against the head 5 of the sleeve 4, to prevent sliding movement of the shaft in one direction, the sliding movement of the shaft in an opposite direction being prevented by a projection 17 upon the shaft 14, the projection being adapted to engage one end of the sleeve 4.

A driving mechanism is provided for imparting rotation to the shaft 14, the driving mechanism comprising a pinion 18 secured t the shaft 14. Another, smaller pinion 19 is mounted for free rotation upon the shaft 14, the pinion 19 being operatively connected with the shaft 14 through the medium of a clutch 20, secured to a bar 21 mounted to slide in bearings 22 which are carried by the pedestal 1, the bar 21 being actuated by a lever 23 which may be fulcrumed upon the pedestal 1. The bar 21 carries a clutch 24, adapted to co-act with a relatively small pinion 25 mounted to turn freely upon a drive shaft 26 journaled for rotation in a bracket 27 carried by the pedestal 1. The pinion 25 meshes into the pinion 18. Secured to the drive shaft 26 is a relatively large pinion 28 meshing into the pinion 19. The drive shaft 26 may carry a belt pulley 29, the pulley 29 being loose upon the shaft 26. The pulley 29 is operatively connected with the shaft 26 through the medium of a clutch 30, controlled by a bell crank 31, fulcrumed at 32 upon the bracket 27, the bell crank 31 being provided with a foot plate 33, located above the base portion 2 of the pedestal 1. A locking lever 35 is fulcrumed at 36 upon the base 2, the lever 35 including a horizontally disposed arm 37, counterweighted as indicated at 38, so as to maintain a shoulder 34 in the lever 35 engaged with the foot plate 33. Projecting laterally from the locking lever 35, and extended to one side of the foot plate 33 is an arm 35$^a$. The bell crank 31 at its free end is adapted to be elevated by a retractile spring 31$^b$ secured to the pedestal 1 and to the intermediate portion of the bell crank.

The sleeve 4 is provided with means for supporting the rotatable core, this means comprising a long arm 39 and a shorter arm 40 projecting in a common direction from the head 5 of the sleeve 4. Journaled for rotation in the arms 39 and 40 is a transverse shaft 41, carrying a beveled pinion 42, meshing into the pinion 15. The shaft 41 carries a pinion 43 which meshes into a pinion 44 supported by a shaft 45, the pinion 44 meshing into a pinion 46 supported by a shaft 47, the shafts 45 and 47 being supported by the longer arm 39. The pinion 46 meshes into a pinion 48 secured to a shaft 49, constituting a support for the core-holder. The core-holder comprises a casing 50 provided with radial guides 51 in which grips 52 are mounted to slide radially of the casing 50. The construction is such that the grips 52 may be advanced to engage with the inner face of the core 53. The specific construction of the casing 50 and its attendant parts is not entered into in detail, for the reason that the structure under consideration forms the subject-matter of a prior Patent No. 1,008,652.

Mechanism is provided for exerting a pressure upon the tire, when the same is mounted upon the core 3, this means comprising a lever 54 fulcrumed as indicated at 55, upon the extremity of the arm 39, there being a carrier 56 mounted to slide upon the lever 54, longitudinally of the same, the carrier supporting for rotation a grooved wheel 57. The carrier 56 may be held in adjusted positions along the lever 54 by means of a set screw 58. Journaled for rotation upon one end of the shaft 49, but held against displacement therefrom, is a head 59 to which a lever 61 is pivoted as indicated at 60, there being a carrier 62 mounted to slide along the lever 61, the carrier 62 carrying for rotation, a grooved wheel 63. The carrier 62 may be held in adjusted positions along the lever 61 by means of a set screw 64. A tensioning means for the web which enters into the construction of the tire, is provided, and in constructing the tensioning means as indicated in Fig. 1, a support 65 is shown, there being a shaft 66 journaled for rotation upon the support, the shaft 66 carrying a sheave 67 around which is trained a flexible element 68, one end of which is secured to a web engaging device, such as a clamp or web grip 69, adapted to engage one end of the web, the clamp 69 being mounted to slide in a guide 70 secured to the support 65. The flexible element 68 is trained over a pulley block 71, held by an overhead support 72, the flexible element being trained about a lower pulley block 73, carrying a hanger 74, supporting a plurality of individually removable weights 75. The end of the flexible element 68 is secured to the pulley block 71 as indicated at 76. Secured to the shaft 66 is a drum 77 about which is disposed a brake strap 78 secured as indicated at 79 to a lever 80, at unequal distances from the fulcrum 81 of the lever. A pawl 127 is pivoted upon the support 65 and is adapted to engage a ratchet wheel 128 which is fixed with respect to the sheave 67. The operation of the structure is as follows:—

When the drive shaft 26 is rotated through the medium of the pulley 29, motion will be transmitted to the shaft 14 through the medium of the pinion 28 and the pinion 19, or through the medium of the pinion 25 and the pinion 18, depending upon the position of the clutch lever 23, it being obvious that by the foregoing arrangement, the shaft 14 may be rotated at high or low speed. When the free end of the clutch lever 23 is moved in one direction, the clutch 24 will engage the pinion 25 and connect the same operatively with the shaft 26. When the free end of the clutch lever 23 is moved in an opposite direction, the clutch 20 will engage the pinion 19, and connect the same operatively with the shaft 14, the pinions 28 and 18 being fixed, respectively, to the shafts 26 and 14.

When rotary motion is thus imparted to the shaft 14 the beveled pinion 15 will actuate the beveled pinion 42, causing a rotation of the shaft 41, rotation being imparted to the shaft 49, through the gear train 43—44—46—48. When the shaft 49 is rotated, the core-holder 50—51—52 will be rotated, causing a rotation of the core 53.

The web from which the tire or casing is fashioned, is indicated by the numeral 126, the web 126 being a rubber bearing structure. One end of the web 126 is engaged by the web grip or clamp 69, the other end of the web being applied to the core 53 which is supposed to be in a vertical position.

When rotatory motion is imparted to the core 53, in the manner hereinbefore described, the web 126 will be wound about the core. When one convolution has been made upon the core 53, the web 126 is cut off at the desired length. In order to accomplish this result, it is necessary or desirable that the rotation of the core 53 should suddenly and abruptly cease. In order to disconnect the shaft 14 from the shaft 26, the foot of the operator is thrust against the bar 35ª, causing a tilting of the locking lever 35, until the shoulder 34 thereof no longer engages with the foot plate 33 of the lever 31, whereupon the spring 31ᵇ will act to elevate the free end of the lever 31, the clutch 30 thus being actuated to disconnect the driving pulley 29 from the shaft 26. When it is desired to connect the shaft 14 operatively with the shaft 26, the foot of the operator is placed upon the plate 33, and the same is depressed until the plate snaps beneath the shoulder 34 of the locking lever 35, the function of the counterweighted arm 37 in this connection, being entirely obvious.

When the web 126 is wound about the core 53, in the manner hereinbefore described, the flexible element 68 will move over the sheave 67, and over the pulleys of the blocks 71 and 73, causing an elevation of the weight 75, the obvious function of the weight 75 being to maintain the flexible element 68 and the web 126 taut. After the web 126 has been cut off, in the manner hereinbefore described, reverse rotation of the shaft 66 and of the sheave 67 is prevented by the action of the pawl and ratchet mechanism 127—128. When it is desired to lower the counterpoise and return the grip to receive another web the brake strap 78 is actuated by the lever 80. One convolution after another may be applied to the core 53, in the manner hereinbefore set forth. After the desired number of plies or layers have been applied to the core 53, the structure thus formed may be smoothed down upon the core, the core being rotated.

The core 53 may be placed in an approximately horizontal position, or at any other desired angle, since the sleeve 4 is rotatable in the bearing 3, and it is to be noted that the core 53 may be rotated, irrespective of the tilt of the core.

When the core is positioned approximately as shown in Fig. 3, beads 129 are applied to the tire. In carrying out this operation, the operator commonly throws the bead over his shoulder and leads the bead between the wheel 63 and the body portion of the tire or casing which has been fashioned upon the core 53, when the core is rotated. It is obvious that any desired pressure may be obtained by manipulating the lever 61 upon its fulcrum 60. The carrier 62 is adjustable longitudinally of the lever 61, so that the bead 129 may be applied at the proper point upon the tire or casing. After one bead has been applied by manipulating the lever 61 in the manner hereinbefore described, the other bead is applied through the medium of the lever 54, the core 53 commonly being reversed during this operation. Either of the levers 61 or 54, when not in use, hangs in a pendant position, as indicated in Fig. 3. The tilting movement of the core 53, or the complete reversal thereof is accomplished by manipulating the hand wheel 11 whereby motion is imparted to the shaft 10 and to the worm 9, the latter meshing into the wheel 6 and causing a rotation of the sleeve 4, the arms 40 and 39 serving to effect a tilting movement of the core 53.

The principle of my invention can be embodied in other constructions with equally as good results so long as the weight is permitted to act upon the fabric or web as it is wound upon the core 53. For example, I might use, instead of the web engaging device 69 and sheave 67 for the cord 68, a roll of fabric from which the core 53 is supplied. The cord 68 could be secured to a shaft or trunnion turning with this roll and the weight thus caused to exert the even tensions required on the fabric as it pays out toward the core holder. Another way would be to permit the fabric to pass between or over retarding rollers, to the shafts or trunnions of which the cord 68 might be secured.

Having thus described the invention, what is claimed is:—

1. The combination with a rotatable core adapted to receive a strip of fabric the end of which is attached thereto; of a traveling stretching member adapted to be connected to said strip of fabric, the fabric itself constituting the means for connecting the core and stretching member while the fabric is being stretched and shaped.

2. In a machine for forming a tire from a web, the combination of a revoluble coreholder and a web holding grip, one of which is movable toward the other, and a tension device for yieldingly resisting the advance of the movable member to maintain a uniform tension on a web extending from the grip to the core.

3. In a tire-forming machine, a rotatably mounted core-holder; a web grip; and counterpoise means operatively connected with the web grip.

4. In a tire-forming machine, a coreholder mounted for rotation; a lever mounted to swing transversely of the core-holder; and a tire-engaging compression member adjustable longitudinally of the lever.

5. In a tire-forming machine, a coreholder mounted for rotation and for tilting movement at an angle to its plane of rotation; means for rotating the core holder irrespective of the tilt of the core-holder; and tire-engaging compression means having an arm mounted co-axially with the core-holder and jointed for swinging movement transversely of the plane of rotation of the holder.

6. In a tire forming machine, a rotatably mounted core holder, an element pivotally supported adjacent the axis of rotation of said holder, and tire engaging means carried by said element and adjustable along same.

7. In a tire making machine, a core holder, web engaging means, and counter-poise means for controlling the web engaging means.

8. In a tire forming machine, a core holder to receive fabric, counter-poise means for uniformly tensioning said fabric as it is supplied to said holder, and means for engaging said fabric influenced by said counter-poise means.

9. In a tire forming machine, a core holder for receiving fabric, counter-poise means for tensioning the fabric as it is supplied to the holder, and web engaging means movable with respect with said holder and influenced by said counter-poise means.

10. In a tire forming machine a revolubly mounted core holder, a web grip, a counter-poise connected with the grip, and frictionally adjutable guiding means between the grip and the poise.

11. In a tire forming machine, a core holder, web engaging means, counter-poise means for controlling the web engaging means, and frictionally adjustable means for controlling the counter-poise means.

12. In a tire forming machine, a core holder to receive fabric, counter-poise means for uniformly tensioning said fabric as it is supplied to said holder, means for engaging said fabric influenced by said counter-poise means, and frictionally adjustable means for controlling the counter-poise means.

13. In a tire forming machine, a rotatably mounted core holder, an arm pivotally supported substantially in line with the axis rotation of said holder, and tire engaging means carried by said arm adjustable along the same.

14. Mechanism for the manufacture of tires comprising means for engaging a web to be used in the body of a tire, counter-poise means for controlling said web engaging means, said web engaging means and said counter-poise means co-acting to exert uniform tension on the web before the body of the tire is formed therefrom and a core holder for receiving said web.

In testimony that I claim the foregoing as my own, I have hereto affixed my signature in the presence of two witnesses.

FRANKLIN W. KREMER.

Witnesses:
J. A. MILLER,
SPENCER WITSON.